UNITED STATES PATENT OFFICE.

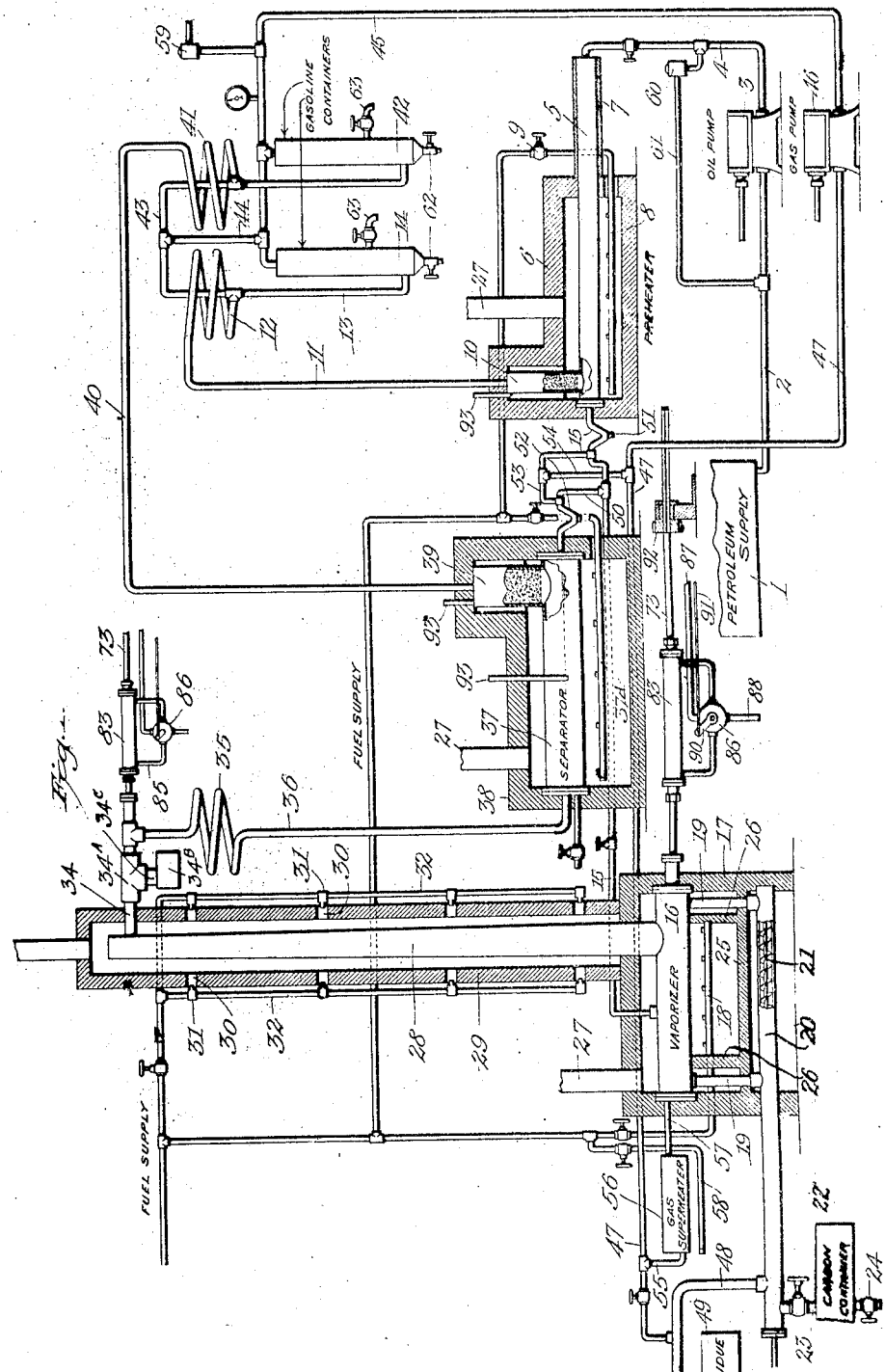

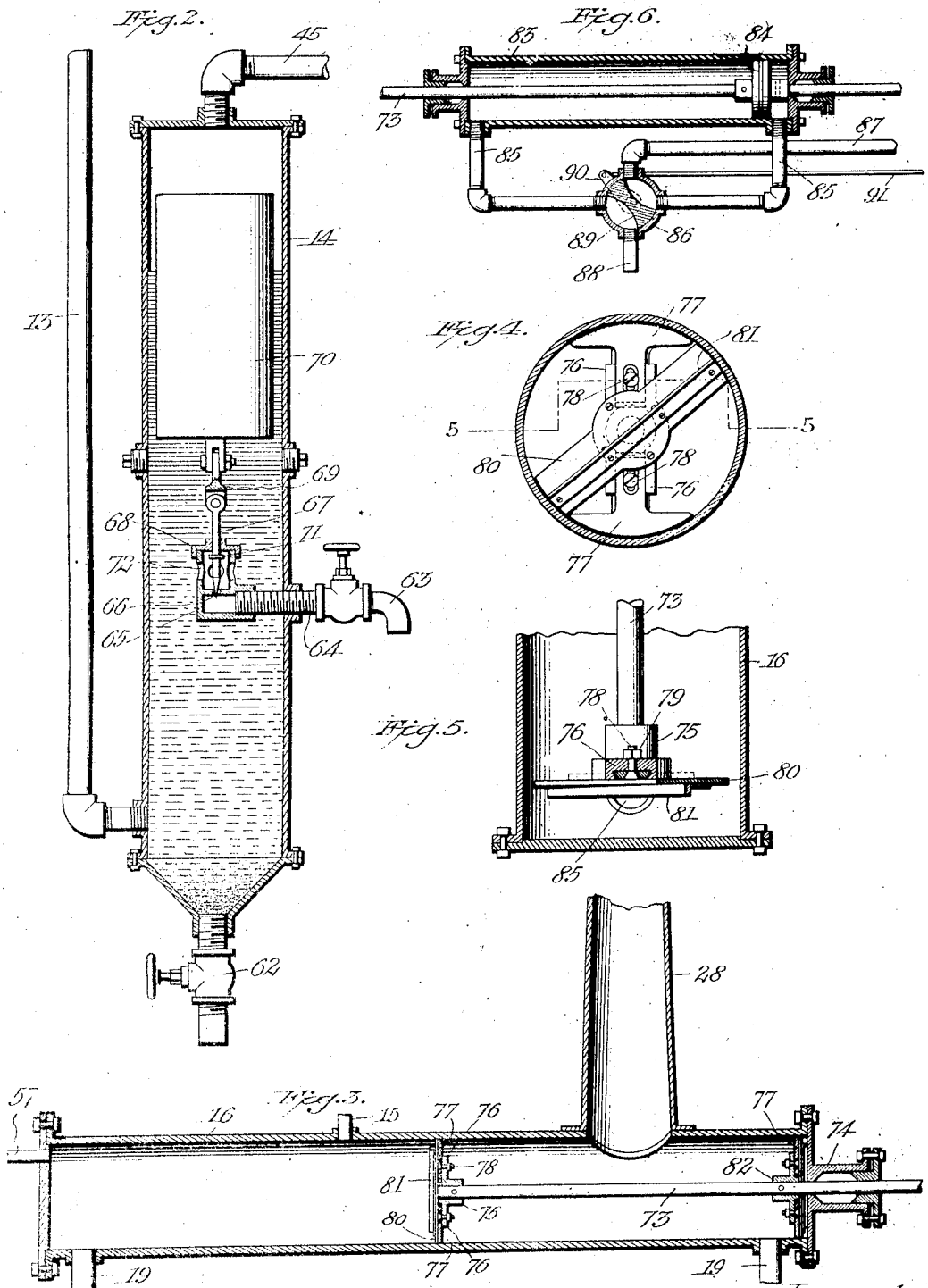

ARTIE A. STAPP, OF DENVER, COLORADO.

APPARATUS FOR OBTAINING DISTILLED PRODUCTS, PARTICULARLY GASOLENE, FROM PETROLEUM AND OTHER OILS.

1,324,213.   Specification of Letters Patent.   Patented Dec. 9, 1919.

Application filed December 4, 1917. Serial No. 205,420.

*To all whom it may concern:*

Be it known that I, ARTIE A. STAPP, a citizen of the United States of America, residing at the city and county of Denver and State of Colorado, have invented a new and useful Apparatus for Obtaining Distilled Products, Particularly Gasolene, from Petroleum and other Oils, of which the following is a specification.

This invention relates to a process not herein claimed, and an apparatus for obtaining distilled products, more especially gasolene, from petroleum and other oils.

The object of the invention is to provide a continuous oil feed apparatus, wherein the product is first passed to a pre-heater and subjected to a temperature sufficient to remove the gasolene fraction, the oil product being then passed to a vaporizer having a predetermined higher temperature, the vapors formed therein passing into a cracking chamber where the temperature is gradually raised to 450 degrees C. or above, the liquids formed at the beginning of the cracking operation dropping back into the vaporizer for further vaporizing, thus, subsequently forming a high percentage of low boiling hydrocarbons; the cracked vapors being continuously removed, partially condensed, and passed to a separator, where the low boiling hydrocarbons are removed and the liquid oil is returned to the vaporizer for further treatment.

Further to provide an apparatus in which the gas which is formed in the cracking tube is super-heated and delivered to the vaporizer, where it mixes with the vapors therein, subsequently forming an additional percentage of saturated hydrocarbons, thereby reducing the loss by gas formation.

To provide means for continuously removing carbon from the vaporizer and other parts of the apparatus where carbon deposits occur, and conveying the said carbon to a receiver.

Further to provide a simply constructed apparatus which is so arranged as to effect an efficient condensation of vapors into a commercial product.

These objects are accomplished by the apparatus illustrated in the accompanying drawings in which:

Figure 1 is a view partly in elevation and partly in section and diagrammatic in character, illustrating the improved apparatus.

Fig. 2 is a vertical, longitudinal, sectional view of one of the gasolene containers.

Fig. 3 is a vertical, longitudinal, sectional view of the vaporizer, showing a reciprocating carbon scraper therein.

Fig. 4 is a vertical, transverse, sectional view of the vaporizer, showing an end view of the scraper.

Fig. 5 is a horizontal, sectional view on the line 5—5 of Fig. 4.

Fig. 6 is a longitudinal, sectional view, showing a cylinder and hydraulically operated piston therein, to which the carbon scraper rod is secured.

Referring to the accompanying drawings:

The numeral 1 indicates a petroleum or other oil supply tank, which is connected by a pipe 2, with a suitable pump 3, which is also connected by a pipe 4, with a pre-heater, which constitutes the first unit of the improved apparatus.

This pre-heater consists of a pipe or tube 5, of suitable dimensions, a portion of which is housed within a heater 6, in the form preferably of a brick or other heat resisting chamber, the portion of the tube 5, outside of the heating chamber being provided with an asbestos wrapping 7, this arrangement effecting a gradual heating of the oil after entering the said pre-heater.

I may employ either oil or gas as a heating medium throughout the apparatus, and to this end a fuel pipe 8, projects into the heater, beneath the tube 5, the pipe being arranged with suitable burners and being connected with a fuel supply. The pipe 8, is provided with a valve 9, for regulating the fuel supply. The end portion of the pipe 5, within the heater, has connected therewith a vertical tube or pipe 10, which constitutes a filtering column, and the heater is constructed to inclose this column also. A pipe 11, extends from the column 10, and connects with a condenser coil 12, which is connected by a pipe 13, with a gasolene container 14.

The filtering column is filled with any suitable material such as iron balls or broken clay, which form a filtering medium for the vapors, whereby a closer separation of the vapors at a given temperature is effected.

A pipe 15, connects the inner end of the tube 5, with a cylindrical vaporizer 16, which is inclosed in a suitable heating chamber 17; and beneath the vaporizer is a fuel pipe 110

18, having suitable burners, the pipe being connected with a fuel supply. The vaporizer has a vertical depending outlet pipe 19, at each end and these pipes connect with a conveyer tube 20, in which is mounted a spiral conveyer 21. The carbon which adheres to the wall and ends of the vaporizer is removed in a manner to be hereinafter described, and passes down through the pipes 19, to the tube 20, whence it is carried forward by the spiral conveyer and deposited in a container 22, which is connected to the tube 20, by a valved pipe 23. The container has a draw-off valve 24, for removing the carbon, during which operation the valve in the pipe 23, is closed.

The heater 17, has a floor 25, beneath which the conveyer tube runs, and inner end walls 26, which are spaced from the main or outer end walls. In the space between these walls are located the pipes 19, which are thus shielded from the heat generated in the heating chamber. The heaters 6 and 17, are provided with outlet pipes or chimneys 27.

From one end of the vaporizer extends a vertical pipe 28, which constitutes a cracking chamber and this pipe is preferably tapered from its lower or inlet end to its upper or outlet end. The cracking tube 28, is surrounded throughout its length by a stack 29, having an outlet pipe or chimney at its upper end, and which is spaced all around from the cracking tube. The stack is formed at regular intervals with oppositely arranged openings 30, in which are introduced burners 31, which are connected to fuel pipes 32, leading to a fuel supply.

The burners 31, are adapted to raise the temperature in the cracking tube to 450 degrees C., or above, in order to break up the heavier hydrocarbons into hydrocarbons of lighter gravity. A pipe 34, extends from the upper end of the cracking tube and forms an outlet for the vapors in said tube; this pipe connects with a condenser 35, which in turn is connected by a pipe 36, with a separator 37, which is preferably cylindrical in form and is housed within a heater 38. The pipe 34 has interposed therein a T 34^A, which is connected with a suitable container 34^B, by a pipe 34^C. Carbon collecting in the pipe 34, is removed in a manner to be hereinafter described, and drops down through the pipe 34^C, into the container 34^B.

The separator has a filtering column 39, at one end similar to the filtering column 10, of the pre-heater, and supplied with the same character of condensing or separating material as the column 10, and a pipe 40, extends from the column 39 to a condenser 41, which in turn connects with a gasolene container 42. A fuel burner 37^A, extends beneath the separator and connects with the main fuel supply pipe.

The condensers 12 and 41 are connected by a gas conveying pipe 43, which is connected by a pipe 44, with a pipe 45, which connects with the upper ends of the containers 14 and 42. The pipe 45, extends from the containers 14 and 42 to a suitable gas pump 46, to which is also connected one end of a pipe 47, which connects at its other end with a pipe 48, that forms a connection between the conveyer tube 20 and a residue container 49.

The end of the separator 37, opposite that which receives the pipe 36, is provided with a pipe 50, which connects with the pipe 15 leading from the pre-heater. The pipes 15 and 50 are formed with traps 51 and 52 respectively, which collect any carbon passing from the pre-heater and separator respectively. The pipes 15 and 50 are also connected by a gas conveying pipe 53, which in turn is connected by a branch pipe 54, with the gas pipe 47, and the pipe 47 has a branch pipe 55, which leads to one end of a superheater 56, the other end of which is connected by a pipe 57, with the vaporizer 16. A fuel burner 58, extends beneath the superheater 56, and is connected with the fuel supply. The gases passing through the pipe 47, enter the superheater through the branch pipe 55, and as the superheater is filled with incandescent carbon these gases absorb a small portion of the said carbon, thereby forming a small percentage of hydrocarbons with a boiling point high enough to permit of condensation at temperatures above 0° C. The vapors thus formed, together with the uncondensed gas, pass through the pipe 57 into the vaporizer, the vapors mixing with those in the vaporizer, and both gas and vapors pass into the cracking tube. The cracked vapors and uncondensed gas pass through the condenser 35 and pipe 36 to the separator, where the low and high boiling hydrocarbons are separated, the low boiling product passing through pipe 40 to the condenser 41, and thence in the form of gasolene to the container 42, while the high boiling product passes again to the vaporizer through pipes 50 and 15.

The gas which is released in the separator passes through pipes 40, 43, and 44 to the upper ends of both gasolene containers, whence it is drawn away by the pump 46, and forced through the super-heater 56 to the vaporizer, and cracking tube as above stated. Thus a continuous circulation of the gas through the apparatus is effected by the pump 46, and a constant pressure of above one atmosphere is maintained by a pressure release valve 59, which permits escape of the gas under excessive pressure.

The oil pipe 4, leading from the oil pump 3 to the pre-heater is also provided with a pressure release valve 60, which is connected by a pipe 61, with the pipe 2 leading to the oil supply tank, or if desired the pipe 61 may connect directly with the supply tank.

The gasolene containers 13 and 42 are each constructed as shown in Fig. 2, and are provided at their lower ends with draw-off valves 62, by which the carbon which settles to the bottoms of the containers can be withdrawn. These containers are also provided with spigots 63, which are connected to the outer ends of threaded nipples 64, on the inner ends of which are screwed elbows 65, each of which is provided with a diaphragm having a conical aperture 66, which is adapted to be opened or closed by a needle valve 67, which extends slidably through an axial hole in a cap 68, which is screwed upon the upper end of the elbow. The upper end of the valve is pivotally connected to the lower end of a link 69, the upper end of which is pivotally connected to a lug on the bottom of a float 70, which is upheld by the body of gasolene in the container. The valve 67 has secured thereon a stop collar 71, which engages the cap 68 and thus limits the upward movement of the valve. The vertical portion of the elbow 65 above the diaphragm, is provided with apertures 72, through which the oil flows to the conical aperture in the diaphragm, and thence out through the spigot. When the flow of oil into the container is continuous the float is elevated and the needle valve is raised and permits the oil to run out through the spigot, but when the oil in the tank drops below a certain level the float descends, and the needle valve causes the outlet, and prevents dripping at the spigot.

In all apparatus for the treatment of petroleum to produce low boiling hydrocarbons, the problem of the removal of carbon wherever it settles and adheres, must be met, in order to insure efficiency, and in the present apparatus I have devised the following mechanism for removing carbon from the vaporizer, and also from the vapor pipe 34 leading from the cracking tube, the mechanisms being the same in both places.

In Fig. 3 is illustrated an enlarged view, in section, of the vaporizer, showing the reciprocating scrapers, and in Fig. 6 is illustrated mechanism for reciprocating the scrapers. The scraping devices are mounted on a rod 73, which passes through a packing box 74, on one end of the vaporizer. Upon the end of the rod which extends into the vaporizer is secured a hub 75, having oppositely extended wing portions 76, which are provided with dove-tailed recesses, and in each of these recesses is slid the shank portion of a scraper 77, the edges of the shank being beveled to fit the recess, as clearly shown in Fig. 5.

The shanks of the scrapers are slotted as shown in Fig. 4, and bolts 78 are passed through the said slots, and through holes in the wings, and receive clamping nuts 79. The slots permit adjustment of the scrapers to fit the vaporizer, as will be understood.

Upon the outer end of the hub 75, is secured a scraper blade 80, of a length equal to the diameter of the vaporizer, and this scraper is so positioned with respect to the scrapers 77 as to lie at the inclination shown in Fig. 4, when the scrapers 77 are in vertical line.

The rod 73 is rotatably, as well as reciprocally mounted in the vaporizer, and the rod is adapted to have a partial rotation at the limit of each stroke, the partial rotation being sufficient to rotate the scrapers 77, a distance equal to the length of their cutting edges, and an angle plate form of scraper 81 is secured to the face of the blade 80, as shown in Fig. 4, which is adapted to contact with the end plate or head of the vaporizer, and scrape a portion of the carbon therefrom on each alternate stroke of the rod.

A hub 82, similar to the hub 75 but facing in the opposite direction, is secured upon the rod 73, at a distance from the first hub, slightly less than half the length of the vaporizer, and this hub is provided with scrapers similar to those carried by the hub 75, with the exception that the blade 80 corresponding to the blade 80 is apertured to receive the rod 73, while the end scraper corresponding to the scraper 81 is formed in two parts which lie on opposite sides of the rod 73, as shown.

The rod 73 is adapted to have a stroke slightly greater than the distance between the two scraping devices, in order that each scraping device may overlap the path of the other at the central portion of the vaporizer, and thus keep the entire surface of the same free from carbon.

The outer extension of the rod 73, passes through a cylinder 83, which is provided with a packing box at each end, and upon that portion of the rod within the cylinder is rigidly mounted a piston 84 having projecting hubs on each side of the same, which engage the heads of the cylinder, to define a space between each cylinder head, and the adjacent face of the piston. Pipes 85 are screwed into threaded apertures in the cylinder adjoining their ends, and the inner ends of these pipes are screwed into a circular valve casing 86, at diametrically opposite points. This casing is also provided with an inlet pipe 87, and an outlet pipe 88, at diametrically opposite points, and a valve 89 is pivotally mounted in the casing. This valve is a four-way valve, and permits the entrance of water into one end of the cylinder back of the piston, and the exit of water from the other end of the cylinder simultaneously. A rock arm 90 is secured to the stem of the valve, and a rod 91 is connected to the rock arm, and any suitable mechanism for operating the rod to oscillate the valve may be employed. Any suitable means may also be employed to partially rotate the rod 73, at the limit of each stroke, and as one way of accomplishing this, I may form the rod 73 square, for a portion of its length, and have the squared portion slide through an intermittently operated ratchet wheel 92 as shown, this feature forming no part of the present invention. By giving to the scrapers a continuous reciprocating movement, together with a partial rotation at the end of each stroke, the whole interior surface of the vaporizer is kept free from carbon deposit, and the carbon thus removed passes down through the pipes 19, and into the conveyer pipe 20, where it is carried by the conveyer 21, to the container 22. The residue, which is a tarry substance, passes from the conveyer pipe up through the pipe 48, and into a container, whence it may be drawn off from time to time.

In practice, oil from the supply tank is pumped continuously into the pre-heater, when the temperature is sufficient to release the low boiling hydrocarbons, particularly the gasolene fraction, which passes through the column 10, and pipe 11 to the condenser 12, and thence to the container 14. The oil then passes through pipe 15 to the vaporizer, and the vapors formed therein pass up through the cracking tube under a continuously increasing temperature, which reaches 450° C. or above, and any liquid which is formed drops back into the vaporizer for further treatment. The cracked product passes into the condenser 35, where the temperature is reduced to about 100° C., and thence it passes into the separator in which the temperature is raised sufficiently to remove the gasolene fraction, and the liquids flow out through pipe 50 into pipe 15 and return to the vaporizer for re-treatment, or if found necessary, by reason of the oil not being perfectly vaporized or cracked it may be piped to another but similar vaporizer having a similar cracking tube, the latter vaporizer having a different temperature. The gasolene vapor passes up through the column 39 and pipe 40 to condenser 41, and thence to container 42. Tubes 93 extend from the separator, and from the columns 10 and 39, and these tubes are adapted to receive a pyrometer by which the temperature in these parts may be ascertained.

Having described my invention, what I claim as new and desire to secure by Letters Patent, is:

1. In an apparatus of the character described, a pre-heater and means for furnishing a continuous supply of oil thereto, a vaporizer and a pipe connecting the vaporizer and pre-heater, a cracking tube leading from the vaporizer, a separator, a pipe connecting the cracking chamber and separator having a condenser, means to conduct vapors from the separator and pre-heater, means for condensing the vapors passing out of the separator and pre-heater, and means for returning the liquid in the separator to the vaporizer.

2. An apparatus of the character described, comprising a pre-heater and means for continuously supplying oil thereto, a vaporizer and a pipe connecting the vaporizer and pre-heater, a cracking tube leading from the vaporizer, a separator, a pipe leading from the upper end of the cracking tube and connecting with the separator, part of said pipe being in the form of a condensing coil, containers, pipes leading from the separator and pre-heater and connecting with said containers, said pipes having condensing coils therein, and a pipe connecting the separator with the pipe connecting the vaporizer and pre-heater, whereby liquid products in the separator are conducted into the last mentioned pipe.

3. In an apparatus for treating oils, to obtain low boiling hydrocarbons, a pre-heater adapted to release the gasoline fraction, a container, and a pipe connecting the container and pre-heater having a condensing coil formed therein, a vaporizer and an oil pipe connecting the same with the pre-heater, a cracking tube leading from the vaporizer, a housing surrounding the same, and means for heating the exterior of said cracking tube, a separator, a pipe connecting the upper end of the cracking tube and separator having a condensing coil formed therein, a container, a vapor-conveying pipe connecting the separator and container, having a condensing coil formed therein, and means for leading back to the vaporizer the uncondensed portions of the gases after the removal of the condensible portion of said gases.

4. In an apparatus for treating heavy oils to obtain low boiling hydrocarbons, a vaporizer and an oil supply pipe connected therewith, a tapered cracking tube leading from the vaporizer and means for heating the same, a separator, a pipe connecting the same with the upper end of the cracking tube, said pipe having a condensing coil formed therein, means for conveying the gasolene fraction away from the separator, means for returning the liquid therein to the vaporizer, piping for conveying the gas formed in the cracking tube to the vaporizer, and means for superheating the gas before it enters the vaporizer.

5. In an apparatus for treating heavy oils, to obtain low boiling hydrocarbons, the combination with a pre-heater, an oil supply, a pump, pipes connecting the pump and oil supply, and pump and pre-heater, a pressure valve in the latter pipe and a pipe connecting the pressure valve with the pipe leading to the oil supply, a vaporizer connected with the pre-heater, a cracking tube, leading from the vaporizer, a separator, a pipe connecting the separator and cracking tube having a condensing coil formed therein, pipes having condensers formed therein, for conveying the vapors from the separator and pre-heater, piping for returning the liquid formed in the separator, to the vaporizer, and piping for leading back to the vaporizer the uncondensed portion of the gases after the removal of the condensible portion of said gases.

6. In an apparatus for the treatment of petroleum oils to obtain low boiling hydrocarbons therefrom, a preheater, a vaporizer, and a pipe connecting them, an oil supply, and a pump connected with the oil supply and pre-heater and means for automatically releasing the pressure in the pipe connecting the pump and pre-heater, a cracking tube leading from the vaporizer, a separator, a pipe connecting the separator and cracking tube having a condensing coil formed therein, gasolene containers, pipes connecting the separator and pre-heater respectively with said containers, said pipes having condensing coils formed therein, means for returning the liquid in said separator to the vaporizer, a conveyer, outlets connecting the vaporizer and conveyer, a residue receptacle, a pipe connecting the same with the conveyer, a gas pipe connected with the tops of the gasolene containers and condensers leading thereto, and with the pipe connecting the conveyer and residue receptacle, a gas super-heater, and pipes connecting the same with the gas pipe and vaporizer, means for maintaining a predetermined pressure in said gas pipe line, and means for circulating the gas.

7. In an apparatus for the treatment of heavy oils to obtain low boiling hydrocarbons therefrom, the combination with a cylindrical horizontally disposed vaporizer, having a cracking tube leading therefrom, of reciprocating means for removing carbon deposit from the inner surface of said vaporizer, a tube, carbon outlet pipes connecting said vaporizer with said tube, a spiral conveyer in said tube, and a carbon container connected with said tube.

8. In an apparatus for the treatment of petroleum oils to obtain low boiling hydrocarbons, a pre-heater comprising a horizontal tube, a heating chamber surrounding a portion of said tube, a vertical filtering column connected to said tube in said chamber, a container, and a pipe connecting the container and filtering column having a condensing coil formed therein, means for supplying oil to the end of the pre-heater outside the heating chamber, a housed vaporizer, a pipe connecting the same with the pre-heater, a vertical tapered cracking tube leading from the vaporizer, a stack surrounding the same but spaced therefrom, and means for progressively heating said cracking chamber from its lower to its upper end, a housed separator having a filtering column, a pipe connecting the separator and cracking tube, having a condenser formed therein, a container, a pipe connecting the filtering column of the separator with said container and having a condenser formed therein, a pipe connecting the separator and vaporizer to return liquid to the vaporizer, gas pipes connecting the containers and condensers leading thereto, with the vaporizer, means for super-heating the gas before it enters the vaporizer, and means for circulating the gas.

9. In an apparatus of the character described, a vaporizer, a carbon-removing scraper therein, and means for reciprocating the same, a cracking tube leading from said vaporizer, a separator, a gasolene container connected therewith, a pipe connecting the upper end of the cracking tube with said separator, means for continuously removing carbon from said pipe, and means for continuously supplying liquid to said vaporizer.

10. In an apparatus for the treatment of heavy oils to obtain low boiling hydrocarbon therefrom, a preheater having a filtering column, means for delivering a continuous, regulated supply of oil to said preheater, and means for heating said preheater to release the gasolene fraction, means for condensing said fraction and for receiving the resultant gasolene, a vaporizer, a cracking tube leading therefrom, an oil pipe connecting the preheater and vaporizer, a separator, condensing means connecting the cracking tube and separator, condensing means for receiving the vapor from the separator, means for returning oil from the separator to the vaporizer for retreatment, means for leading back to the vaporizer the uncondensed portion of the gases after the removal of the condensible portion thereof, and means for super-heating said gas before it enters the vaporizer.

In testimony whereof I affix my signature in presence of two witnesses.

ARTIE A. STAPP.

Witnesses:
G. SARGENT ELLIOTT,
ELIZABETH SMITH.